March 21, 1967    H. J. HEIT    3,310,654
THERMOSTATIC CONTROL SYSTEM WITH ANTICIPATION
Filed May 25, 1964    2 Sheets-Sheet 2
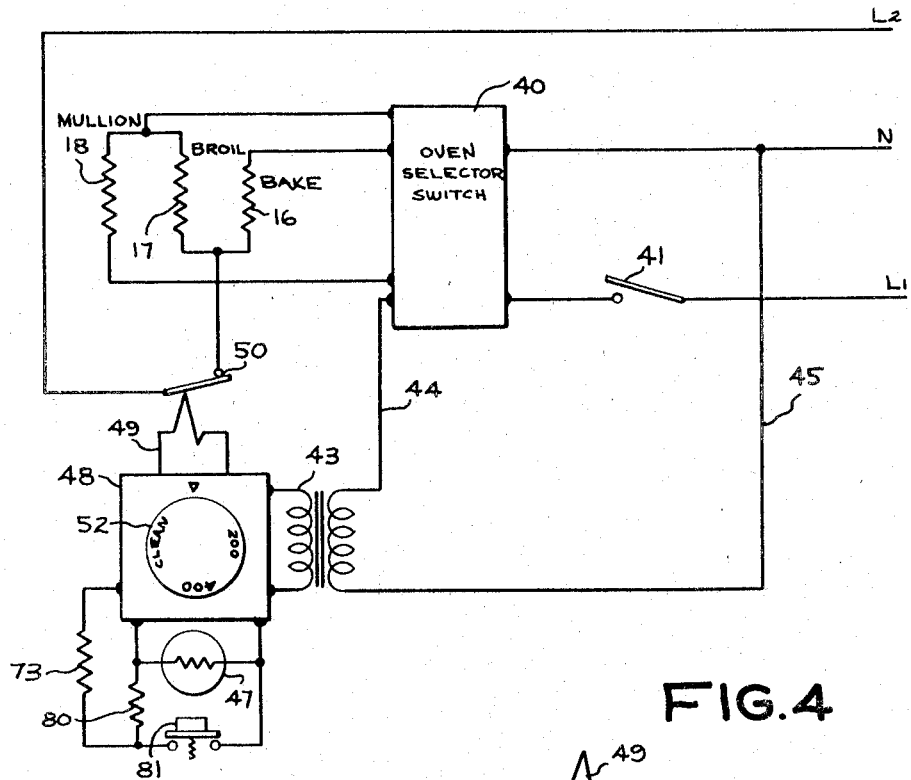
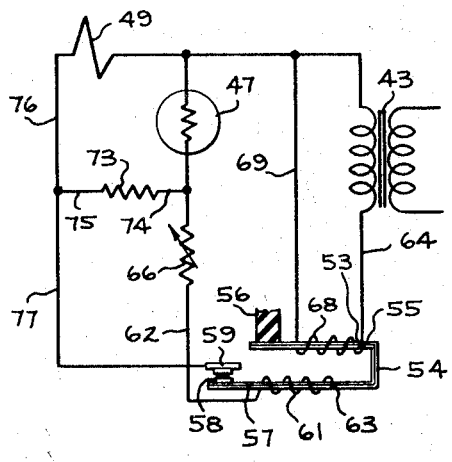
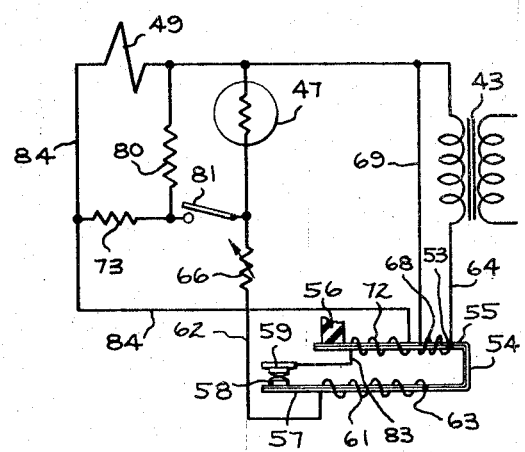
INVENTOR.
HENRY J. HEIT
BY Richard L. Caslin
HIS ATTORNEY United States Patent Office 3,310,654
Patented Mar. 21, 1967

3,310,654
THERMOSTATIC CONTROL SYSTEM WITH ANTICIPATION
Henry J. Heit, Louisville, Ky., assignor to General Electric Company, a corporation of New York
Filed May 25, 1964, Ser. No. 369,719
8 Claims. (Cl. 219—393)

This invention relates to a temperature controlling system and particularly to apparatus for controlling the operation of a heating means in accordance with the sensed temperature of a body being heated, while providing anticipation to the system so as to prevent excessive overshoot by cutting the power input before a desired temperature is reached.

This invention is a modification of the thermostatic control system described and claimed by Stanley B. Welch in Patent No. 3,122,626, which is assigned to the General Electric Company, the assignee of the present invention.

There is no reason why the use of this invention should be limited to domestic ovens although it has found its greatest utility in controlling a high temperature oven where the oven is operated at both normal cooking temperatures between about 150° F. and 550° F. and at higher temperatures between about 750° F. and about 950° F. for degrading the food soil and grease spatter that accumulate on the walls of the oven liner while cooking is performed within the oven. One example of such a high temperature oven is a self-cleaning oven design taught by Bohdan Hurko in Patent No. 3,121,158, which is also assigned to the General Electric Company, the assignee of the present invention.

In recent years heretofore, hydraulic thermostats have been used almost exclusively for controlling the temperature within domestic ovens. Such thermostats have generally been provided with an elongated bulb or probe formed on the end of an elongated capillary tube that is joined at its opposite end to a bellows or diaphragm within the thermostat housing as is taught by W. J. Ettinger in Patent No. 2,260,014. The normal oven cooking temperatures have been between about 150° F. and a maximum of about 550° F., and the thermal responsive fluids used in the hydraulic control systems have been able to withstand this degree of temperature without difficulty. However, the thermally responsive fluids that are presently available cannot be operated at temperatures much above this value without becoming totally inoperative.

This invention contemplates the use of an electrical thermostatic control circuit network of the type comprising a remote variable-resistance temperature sensor associated with a responder that in turn governs an output relay that controls the supply of power to the heating means of the oven. Moreover, a two-way acting anticipation means is included so as to reduce the amplitude of the temperature controlled by the network so as to gain more precise control.

The principal object of the present invention is to provide an electrical thermostatic control circuit network governing the energization of heating means for a body, where said network includes an improved anticipation means to restrict the amplitude of temperature change required by the operation of the network and maintain a stable condition.

A further object of the present invention is to provide an electrical thermostatic control circuit network of the class described having a small amount of anticipation at the lower temperatures and a larger amount of anticipation at the higher temperature range.

The present invention, in accordance with one form thereof, embodies an electrical thermostatic control circuit network that is adapted to be connected to a source of voltage and comprises a remote variable-resistance temperature sensor that is adapted to be located in heat transfer relationship with a body whose temperature is to be controlled. The sensor is associated with a responder that receives signals from the sensor as a function of the temperature experienced by the sensor and in turn serves to cycle current modulating contacts of the responder. These contacts control the operation of an output relay that governs the energization of the heating means for the body whose temperature is to be governed. The responder includes a thermally responsive element with the current modulating contacts which cycle open and close as a function of whether the temperature of the body is above or below the critical preset temperature of the responder. The thermally responsive element is provided with a responder heater winding that is connected to the sensor for receiving signals from the sensor. An anticipation means including an external resistor separate from the thermally responsive element has been adopted and it is governed by the responder contacts whereby when the contacts are closed the external resistor is connected in parallel with the responder winding so as to decrease the voltage drop across the responder winding and thus increase the force tending to open the responder contacts thereby reducing the amplitude of temperature change necessary for the cycling of the responder contacts. Moreover, when the responder contacts are open, the external resistor is connected in parallel with the sensor thus increasing the current flow through the responder winding to increase the force tending to close the responder contacts so as to provide anticipation for both the opening and closing action of the responder. Further modifications comprise the inclusion of a biasing resistor associated with the temperature sensor for shifting the control point of the sensor so as to obtain a higher temperature range. Switching means is provided for controlling the use of the biasing resistor and it is also associated with the external resistor for governing the same. An anticipator winding is associated with the thermally responsive element so that a small anticipation is provided for the lower temperature range of the control circuit network and a larger anticipation for the higher temperature range.

My invention will be better understood from the following description taken in conjunction with the accompanying drawings and its scope will be pointed out in the appending claims.

FIGURE 2 is a schematic wiring diagram of the power circuit in general and the temperature control circuits in particular for an oven heating system incorporating the present invention;

FIGURE 3 is a circuit diagram of one embodiment of the control circuit network of the present invention comprising an anticipation means in the form of an external resistor for cooperation with the responder;

FIGURE 4 is a circuit diagram of a second embodiment of the present invention that also incorporates an external resistor for use with the responder, in addition to an anticipator winding associated with the thermally responsive element where there is a small anticipation at the lower temperature range and a larger anticipation at the higher temperature range.

Figure 1:
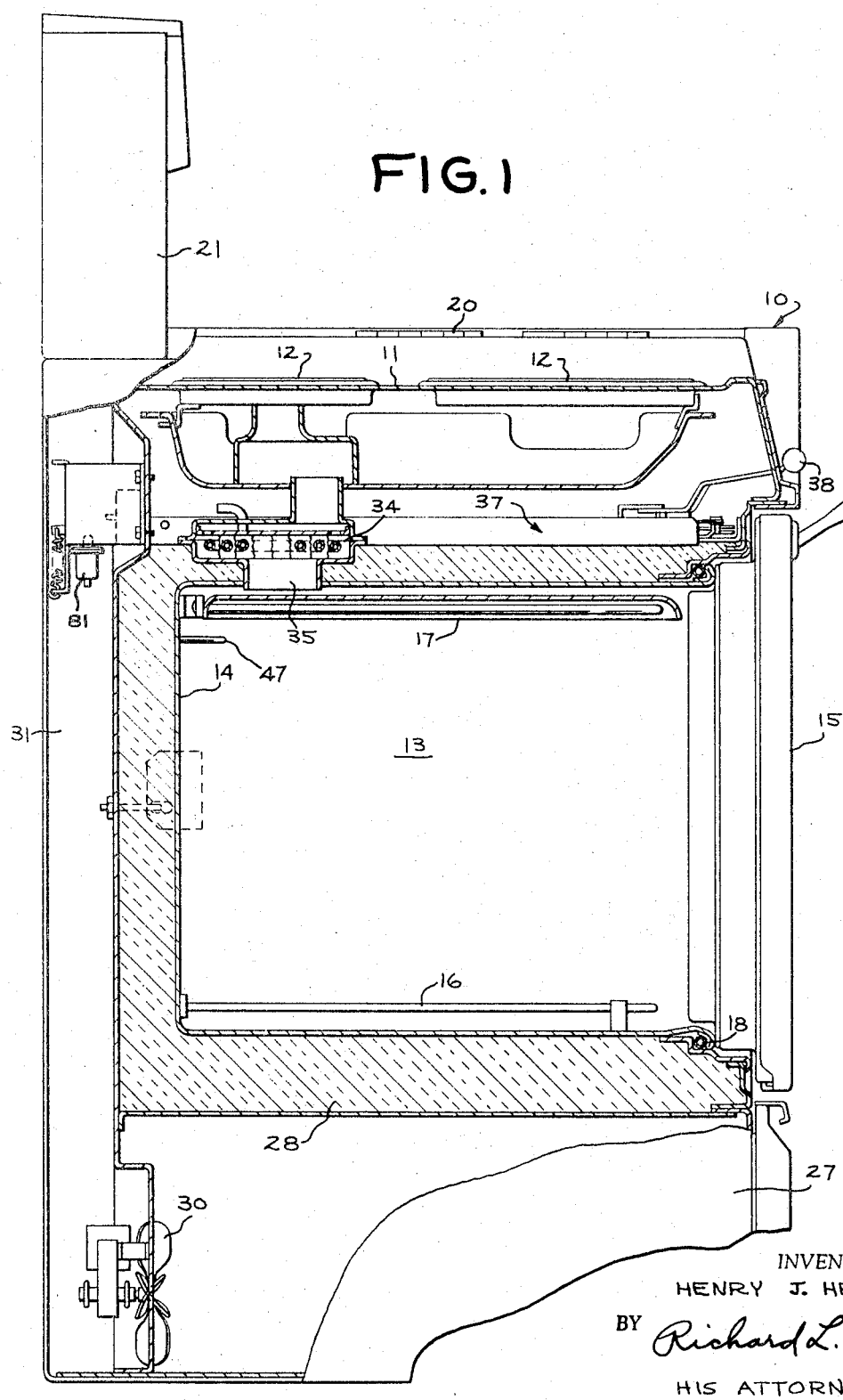
FIGURE 1 is a left-side elevational view of a free-standing electric range with certain parts broken away and some in cross-section to show the main elements of an oven which is provided with the electrical thermostatic control circuit network embodying the present invention.

Turning now to a consideration of the drawings and in particular to FIGURE 1 there is shown for illustrative purposes a free-standing electric range 10 having a top cooking surface or cooktop 11 with a plurality of surface heating elements 12, an oven cavity 13 formed by a box-like oven liner 14, and a front-opening drop door 15. The oven cavity 13 is supplied with the usual source of heat energy; namely, two electric resistance heating elements in the form of a lower baking element 16 and an upper broiling element 17. A third heating element has been added adjacent the oven door 15, and it is a mullion or perimeter heater 18 that is wrapped around the oven liner in a manner that is taught by J. K. Newell in Patent No. 3,017,488 which is assigned to the General Electric Company, the assignee of the present invention. The control of the surface heating elements 12 is obtained by a series of selector switches 20 which are illustrated as multiple pushbutton switches arranged in pairs along the opposite side arms of the cooktop 11 to be oriented with the particular heating element that is being controlled thereby. In addition the range is provided with a backsplash 21 that is arranged along the back edge of the cooktop and is provided with a control panel 22 which contains most of the remaining controls for the surface heating elements 12 and for the oven compartment.

Other structural features that might be mentioned by name would be the outer range body or cabinet 27 which has an enamelled or metallic appearance finish and which supports and encloses the various components of the range. Sandwiched between the oven liner 14 and the range body or cabinet 27 is a thick blanket of insulating material 28 such as fiberglass or the like. The amount of insulation being used has been increased over the amount of insulation for standard ovens because of the high operating temperature encountered during the heat cleaning operation which will reach a maximum oven air temperature somewhere between about 750° F. and 950° F. Another feature shown is an air circulating fan 30 located in the bottom portion of the range adjacent the back wall thereof. This fan serves to draw relatively cool room air into the range body 27 through the back of the backsplasher 21 and down a vertical duct or wiring channel 31 at the back of the range and into the bottom portion of the range where the air rises up suitable ducts (not shown) built into the opposite side walls of the oven where the air discharges under the cooktop 11 and then is exhausted through openings through and around the surface heating elements 12.

During the heat cleaning operation free carbon, soot and carbon monoxide gases are formed and these must be oxidized before returning them to the kitchen atmosphere so as to prevent air contamination. A catalytic smoke eliminator 34 is positioned in the oven vent opening 35 to serve as an exhaust means for the oven, and it might be of the type that is taught in the Stanley B. Welch Patent No. 2,009,483 which is assigned to the General Electric Company, the assignee of the present invention. Such a smoke eliminator includes a heating means in cooperation with the catalytic platinum surface such as a wire screen that is heated to a temperature of about 1300° F. and tends to consume the smoke, odors and vapors emanating from the oven cavity so that the oven exhaust is treated in a manner that is best described in the patent of Bohdan Hurko, No. 3,121,158, which was cited previously.

It has been found desirable to provide a latch means for the oven door 15 to insure that the oven door is closed and cannot be opened while the oven is being operated on a heat cleaning cycle. The particular door latching mechanism is identified generally as element 37 in FIGURE 1, and it is disclosed in detail in the copending application of Clarence Getman, Ser. No. 277,174 which was filed on May 1, 1963 and is assigned to the General Electric Company, assignee of the present invention.

Turning now to a consideration of the oven circuit diagram of FIGURE 2, there is provided with an electrical service of three-wire Edison source of power; nominally of 240 volts, single phase, 60 cycle A.C. which is usually available in the average residence having adequate wiring. This voltage source has a pair of line wires L1 and L2 and a grounded neutral conductor N for supplying energy to the electrical load of the oven made up of the bake element 16, the broil element 17 and the mullion heater 18. This power circuit is controlled by an oven selector switch 40 which may be either a rotary switch or a multiple pushbutton switch as is conventional in this art. Switch contacts 41 are shown in line L1 and these are governed by a clock timer (not shown) in order to obtain timed baking operations.

The three types of cooking operations to be performed are baking, broiling and timed baking. A typical circuit during a baking operation would be to have the bake element 16 connected to a source of high voltage across line wires L1 and L2 at 240 volts, while at the same time the broil element 17 and the mullion heater 18 are connected in series across lines L1 and L2. A circuit for a typical broiling operation has only the broil element 17 energized and it is at 240 volts across lines L1 and L2. The timed baking operation has the same circuit as the baking operation except that the circuit is controlled by the timer contacts 41 as is well understood in this art. The normal cooking temperature range is from about 150° F. to about 550° F. The broiling operation has the highest temperature setting of about 550° F.

It is necessary to provide an oven temperature control system for governing the heating elements so as to be able to reach and hold preset temperature levels which are necessary for proper cooking results. Such a temperature control system is represented by an electrical control circuit network which forms the subject matter of the present invention, and it is connected in the power circuit for cycling the heating elements to maintain a stable condition. The network is operated at a low voltage of about 11½ volts from the secondary of a step-down transformer 43 whose primary is connected by leads 44 and 45 across line L1 and neutral N through the oven selector switch 40. The principal components of the circuit are a variable-resistance temperature sensor 47 that is adapted to be located in heat transfer relationship with the oven cavity 13, and a responder 48 of the general type taught in the Baker Patent 2,962,575 which are available from the King-Seeley Thermos Company of Ann Arbor, Michigan. This responder 48 is adapted to receive signals from the sensor 47 as a function of the temperature of the oven or other body which temperature is being controlled. The responder in turn governs an output relay such as hot wire relay 49 which has relay contacts 50 that are disposed in the power circuit supplying the heating elements 16–18 as is well understood in this art. The responder 48 includes a manually adjustable knob 52 which is used for setting the responder to its various temperature levels varying through the baking temperature range, and including a broil position as well as a high temperature heat cleaning position.

It should be appreciated that for the sake of simplicity the power circuit has not been described in detail, nor have the various safety interlock circuits cooperating with the door latching mechanism to insure that the oven door is closed and remains closed during a high temperature heat cleaning operation. For a more detailed explanation of the power circuit attention is directed to the copending application of Samuel C. Jordan, now Patent No. 3,270,183 which was filed on Nov. 14, 1963 and is assigned to the General Electric Company, assignee of the present invention.

The first modification of the present invention is best illustrated in FIGURE 3 where the responder mechanism is shown in more detail and like elements are identified by the same reference numerals as used heretofore. The responder 48 includes a thermally responsive member in the form of a U-shaped bimetal or polymetallic member 54. The end of one leg 55 of the bimetal is fastened to a stationary support member 56, while the other leg 57 is a movable leg that is provided with a contact member 58 cooperating with a fixed contact 59. These contacts serve as current modulating contacts for controlling the energization of the output relay 49, and hence the electrical load. In order to make the bimetal 54 responsive to the temperature experienced by the sensor 47, a first heater winding 61 is added to the bimetal as for instance wrapping it around the leg 57. One terminal of the heater winding 61 is connected in series with the sensor 47 by means of lead 62, while its other terminal is connected back to the secondary of the transformer 43 first by a connection to the bimetal 54 and by means of lead 64 that is also connected to the bimetal as at 53. Hence, the sensor 47 and the responder winding 61 are connected in series across the transformer secondary. The hot wire relay 49 is connected in parallel with the sensor 47 and responder winding 61 by means of leads 76 and 77 and through the responder contacts 58 and 59, through leg 57 to the responder winding terminal at 63. In order to change the temperature settings of the responder a variable resistor 66 is included in the responder and it is mounted on the shaft (not shown) of the rotary knob 52 mentioned heretofore. This variable resistor 66 is electrically connected in series with the sensor 47 and the responder winding 61.

In order to obtain accurate results under varying conditions of voltage supply, a voltage regulating means is built into the responder and its function is to receive the noticeably varying voltage from across the secondary of the transformer 43 to compensate for voltage variations so that the operation of the responder element 54 is independent thereof. The voltage regulator comprises a second heater winding 68 which is in heat transfer relationship with the responder element 54 as for example being wound around the leg 55 and connected to the secondary of the transformer 43 by means of leads 69 and 64. This is done by having one terminal connected to lead 69 while having its other terminal connected to lead 64 at the point 53 on the bimetal leg 55.

The elements of the temperature control circuit as have been described above are generally standard in the art of automatic surface unit controls, thus the departure of the present invention will be described hereinafter. It is important to provide an anticipation means cooperating with the responder winding 61 so as to reduce the amplitude of the temperature changes that are required to turn the control On and Off. With no form of anticipation the temperature change required would be very large. A typical type of anticipation means normally used heretofore would be a third heater winding or anticipator winding such as element 72 that is wound around one leg of the responder element or bimetal 54 as is illustrated in the second modification of FIGURE 4.

However, the present invention consists of an improved method of providing anticipation in the form of a resistor 73 separate from the bimetal, which resistor has one terminal connected by lead 74 between the sensor 47 and the variable resistor 66, while its other terminal is connected by lead 75 to a connection between the hot wire relay 49 and the fixed contact 59 of the responder contacts as by means of leads 76 and 77 respectively. When the oven is up to temperature, that is, when no additional heat is demanded, the responder contacts 58 and 59 are opened. This opens the hot wire relay contacts 50 and forms a series circuit with the external resistor 73 and the relay 49 to be in parallel with the sensor 47. The resistance of the resistor 73 is so high that this does not adversely affect the operation of the sensor 47. When the temperature in the oven drops below the preset temperature determined by the responder setting, the responder contacts 58 and 59 will close again, thus connecting the external resistor 73 in parallel with the variable resistor 66 and the responder winding 61 through the responder contacts 58 and 59. The effect of this is to decrease the voltage drop across the responder winding 61 and this increases the force tending to open the responder switch contacts 58 and 59 ahead of the time they would normally open.

The second modification of this invention is illustrated in FIGURE 4 where the same elements are identified by the same reference numerals as used heretofore. The principal difference in this circuit modification is the inclusion of a means for shifting the control point of the sensor 47 so as to obtain a second temperature range; namely, a high temperature range above the normal cooking temperatures to encompass the heat cleaning temperature range that might have a maximum temperature somewhere between about 750° F. and about 950° F. This is accomplished by incorporating a biasing resistor 80 that is adapted to be shunted across the sensor 47 in order to vary the effective resistance of the sensor circuit. This connection is made by a normally open switch 81 that is adapted to be closed automatically when the latching mechanism 37 of the oven door 15 is closed as can be seen at the back of the oven in FIGURE 1. Accordingly, the high temperature circuit cannot be completed unless the oven door is latched thus closing the door latch switch 81. This reduces the effective resistance of the sensor 47 and reduces the current flow to the responder. This means for shifting the control point of the sensor is described and claimed by Stanley B. Welch in Patent No. 3,122,626 which issued on Feb. 25, 1964 and is assigned to General Electric Company, the assignee of the present invention. Moreover, the external resistor 73 of the first modification of FIGURE 3 has been carried over into the second modification except that it has been connected with the door latch switch 81 so that it is added to the circuit automatically as an anticipation to the responder element 54 whenever the heat cleaning operation is set in motion.

The external resistor 73 in the second modification provides anticipation for the high temperature range of the heat cleaning cycle, but it would not be used in the control circuit during normal cooking operations. A second anticipator; namely, a heater winding 72 has been included in the circuit to be in series with the responder contacts 58 and 59 as by means of lead 83. The other terminal of the anticipator winding 72 is connected to the hot wire relay 49 by means of lead 84. Only a small amount of anticipation is necessary at baking temperatures, while a large amount of anticipation is desirable at the heat cleaning temperatures. During heat cleaning both anticipators 72 and 73 are arranged in series with each other in a circuit paralleling the variable resistor 66 and the responder winding 61. During normal cooking operations, the door latch switch 81 is open so the external resistor 73 is in effect de-energized.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. An electrical thermostatic control system for controlling the temperature of a body having electrical resistance heating elements in a power circuit that is adapted to be connected to a relatively high voltage source for supplying a variable amount of heat to said body, and selector switch means for establishing various power circuits for the heating elements; the invention comprising a thermostatic control assembly that is adapted to be fed from a low voltage source for controlling the energization of the power circuit to obtain predetermined temperature levels of the body, said assembly including a temperature sensing means, a temperature responding means and an output relay means that has switch contacts that are connected in the power circuit, said sensing means being a variable resistor having a high temperature coefficient of resistance and adapted to be in heat transfer relationship with the body, said responding means including a self-interrupting thermal relay with a pair of electrical contacts connected in series with a winding of the output relay means, the said thermal relay having a first heater winding connected in series with the sensing means for modifying the output voltage in accordance with the sensed temperature of the body, the thermal relay means having a second heater winding connected across the low voltage source for compensating for supply voltage variations, a potentiometer connected in series with the said sensing resistor and the said first heater winding for setting the temperature level of the assembly, and an external resistor connected at one end between the sensing resistor and the potentiometer and as its other end to the output relay whereby when the thermal relay contacts are open the external resistor is connected in parallel with the sensing resistor and thus increases the current flow through the first heater winding thereby increasing the force tending to close the thermal relay contacts, while when the thermal relay contacts are closed the external resistor is connected in parallel across the said potentiometer and the first heater winding so that the voltage drop across the first heater winding decreases and the current through said winding decreases thereby increasing the force tending to open the thermal relay contacts, the said external resistor thus serving as a two-way acting anticipator to reduce the amplitude of temperature of the said body at a predetermined temperature level.

2. A system for controlling the temperature of a body in heat transfer relationship with an electrical resistance type heater by applying to the heater electrical energy from a source of electrical energy as a series of pulses of energy, the average energy value of which is varied in accordance with the sensed temperature of the body, self-interrupting electro-thermal means connected to the energy source, mateable electrical contacts controlled by the electro-thermal means for governing the energization of the heater, temperature sensing means in heat transfer relationship with the body and having a high temperature coefficient of resistance, a first electrical resistance heating means, circuit means interconnecting the temperature sensing means with said first heating means and said electro-thermal means to produce a varying current through said first heating means as a function of variations in the sensed temperature of the body, selector means for predetermining a control temperature of the body at which the contacts of the electro-thermal means will de-energize the heater, and an anticipating resistor for reducing the amplitude of the temperature control device, circuit means for connecting the resistor in parallel with the said first heating means so as to reduce the current flow to the said first heating means and tending to open the contacts of the electro-thermal means and reducing the power to the heater just before the preset control temperature is reached.

3. A temperature control system adapted to control the power delivered to the heating means of a body, said control system comprising means for connecting to a source of electrical power, a variable-resistance temperature sensor adapted to be in heat transfer relationship with the body, a responder relay having contact means adapted to control energy to the heating means, a first heater winding in heat transfer relationship with the responder relay and in series with the sensor whereby changes in the temperature of the sensor will vary the current flowing to the said first heater winding and hence control the responder relay as a function of temperature changes of the body, and adjustable means for varying the critical temperature at which the responder relay opens, a second heater winding in heat transfer relationship with the responder relay, circuit means connecting said second heater winding in parallel with both the sensor and the said first heater winding so as to compensate the responder relay for voltage variations of the source of electrical power, a third heater winding in heat transfer relationship with the responder relay, and circuit means connecting the third heater winding in series with the responder relay contacts so that whenever the relay contacts are closed the third heater winding is energized to provide anticipation to the control system and reduce the amplitude at the critical temperature, and means for shifting the control point of the sensor, said last mentioned means comprising a biasing resistor shunted across the sensor, and switch means for connecting the biasing resistor in and out of the circuit, and an anticipator resistor connected by the said switch means in a series circuit with the said third heater winding for increasing the anticipation of the responder relay by decreasing the voltage drop across the said first heater winding tending to exert a force to open the responder relay contacts.

4. A temperature controlling system for controlling the temperature of a body being heated by a heater, a source of energy, a temperature responsive sensor having a high temperature coefficient of resistance and disposed in heat transfer relationship with the body, a responder relay having a generally U-shaped polymetallic element including an anchored leg and a movable contact-carrying leg, a fixed contact cooperating with the movable contact, and an output relay controlled by the said contacts of the responder relay, the said element including at least three heater windings, the first heater winding or responder winding being in series with the sensor, a second heater winding or anticipator winding being in series with the responder relay contacts, and a third heater winding or voltage regulator winding in parallel circuit with the series circuit of the sensor and the first heater winding, a biasing resistor for shifting the control point of the sensor for higher temperature use, circuit means for shunting the biasing resistor across the sensor so as to obtain accurate temperature control through a wide range of temperatures; the invention comprising a resistor remote from the U-shaped polymetallic element and circuit-connected with the biasing resistor to be energized in series with the second heater winding or anticipator winding so as to provide a large amount of anticipation at the higher temperatures.

5. A thermostatic control circuit network for the heating system of an oven comprising a variable-resistance temperature sensor adapted to be located in heat transfer relationship with an oven and to be connected with a source of voltage, a responder relay associated with the sensor, and an output relay controlled by the responder relay and in turn controlling the energization of the heating system, a variable resistor circuit-connected with the sensor to vary the current through the sensor and thus set the critical temperature of the sensor, means for regulating the voltage of the network so the voltage is independent of variations in the source of voltage, the responder relay including a thermally responsive element having current modulating contacts for controlling the said output relay, a heater winding associated with the said element, and circuit means joining the heater winding to the sensor so that changes in oven temperature experienced by the sensor tend to vary the current carried by the heater winding and hence cause the movement of the element as a function of oven temperature, and an external resistor separate from the thermally responsive element but in a circuit with the responder contacts so that when the said contacts are open, the external resistor is arranged in parallel with the sensor, while when the contacts are closed the external resistor is connected in parallel with both the variable resistor and the responder heater winding to reduce the voltage drop across the heater winding and provide anticipation for the circuit network.

6. A thermostatic control circuit network as recited in claim 5 with the inclusion of a biasing resistor associated with the sensor to shift the control point of the sensor, and switching means for connecting the sensing resistor in and out of the circuit, the external resistor being activated by the said switching means.

7. A thermostatic control circuit for use in controlling the heating means of an electric cooking apparatus, said control circuit including a variable-resistance temperature sensor adapted to be in heat transfer relationship with the heating means, a temperature responder for receiving signals from the sensor, and an output relay controlled by the responder as a function of the temperature experienced by the sensor, the output relay adapted to govern the power supplied to the heating means, the responder including a thermally responsive element having current modulating contacts circuit-connected to the output relay, a responder winding in heat transfer relationship with the said element and being circuit-connected to the sensor so that changes in the temperature of the sensor will vary the current to the responder winding causing the said element to cycle as a function of sensor temperature, an anticipation means including an external resistor associated with the responder contacts, the said contacts in the open position arranging the external resistor in parallel with the sensor, while the contacts in closed position arrange the external resistor in parallel with the responder winding thus decreasing the voltage drop across the responder winding to increase the force tending to open the responder contacts.

8. A temperature control system adapted to control the power delivered to the heating means of a body, said control system comprising means for connecting the system to a source of electrical power, a variable-resistance temperature sensor adapted to be in heat transfer relationship with the body, a responder relay having contact means adapted to control energy to the heating means, a first heater winding in heat transfer relationship with the responder relay and in series with the sensor whereby changes in the temperature of the sensor will vary the current flowing to the said first heater winding and hence control the responder relay as a function of temperature changes of the body, a potentiometer connected in series with the temperature sensor and the first heater winding for setting the temperature level of the control system, a second heater winding in heat transfer relationship with the responder relay, circuit means connecting said second heater winding in parallel with both the sensor and the said first heater winding so as to compensate the responder relay for voltage variations of the source of electrical power, a third heater winding in heat transfer relationship with the responder relay, and circuit means connecting the third heater winding in series with the responder relay contacts so that whenever the relay contacts are closed the third heater winding is energized to provide anticipation to the control system and reduce the amplitude at the critical temperature, and an output relay means having a heater winding arranged in series with the responder relay contacts, and means for shifting the control point of the sensor, said last mentioned means comprising a biasing resistor shunted across the sensor, and switch means for connecting the biasing resistor in and out of the circuit, and an external resistor connected at one end between the temperature sensor and the potentiometer and at its other end to the winding of the output relay whereby when the responder contacts are open the external resistor is connected in parallel with the temperature sensor and thus increases the current flow through the first heater winding thereby increasing the force tending to close the responder contacts, while when the responder contacts are closed the external resistor is connected in parallel across the said potentiometer and the first heater winding so that the voltage drop across the first heater winding decreases and current through said winding decreases thereby increasing the force tending to open the responder contacts, the said external resistor thus serving as a two-way acting anticipator to reduce the amplitude of temperature of the said body at a predetermined temperature level.

References Cited by the Examiner
UNITED STATES PATENTS

| 2,487,556 | 11/1949 | Jenkins | 236—78 |
| 2,545,353 | 3/1951 | Gund | 236—78 |
| 3,031,565 | 4/1962 | Appelton et al. | 200—122 |
| 3,116,398 | 12/1963 | Welch | 219—413 |
| 3,122,626 | 2/1964 | Welch | 219—395 |

RICHARD M. WOOD, *Primary Examiner.*

C. L. ALBRITTON, *Assistant Examiner.*